(12) United States Patent
Cehelnik

(10) Patent No.: US 7,078,911 B2
(45) Date of Patent: Jul. 18, 2006

(54) PATENT APPLICATION FOR A COMPUTER MOTIONAL COMMAND INTERFACE

(76) Inventor: Thomas G. Cehelnik, 8300 E. Ocotillo Dr., Tucson, AZ (US) 85750

( * ) Notice: Subject to any disclaimer, the term of this patent is extended or adjusted under 35 U.S.C. 154(b) by 0 days.

(21) Appl. No.: 10/772,908

(22) Filed: Feb. 5, 2004

(65) Prior Publication Data

US 2004/0251918 A1    Dec. 16, 2004

Related U.S. Application Data

(60) Provisional application No. 60/515,844, filed on Oct. 30, 2003, provisional application No. 60/445,548, filed on Feb. 6, 2003.

(51) Int. Cl.
*G01R 29/12* (2006.01)
*G01R 27/26* (2006.01)
*G01B 7/30* (2006.01)
*A61B 5/00* (2006.01)

(52) U.S. Cl. ............... 324/457; 324/687; 324/207.22; 73/865.4

(58) Field of Classification Search ............ 324/663, 324/207.11–207.26, 457–458, 662, 687–690, 324/716; 73/865.4, 514
See application file for complete search history.

(56) References Cited

U.S. PATENT DOCUMENTS

| | | | |
|---|---|---|---|
| 4,016,490 A | | 4/1977 | Weckenmann et al. |
| 4,169,260 A | | 9/1979 | Bayer |
| 5,028,875 A | * | 7/1991 | Peters ........................ 324/660 |
| 5,130,672 A | | 7/1992 | Watkiss et al. |
| 5,408,411 A | * | 4/1995 | Nakamura et al. ............ 701/48 |
| 5,430,613 A | | 7/1995 | Ghosh et al. |
| 5,730,165 A | * | 3/1998 | Philipp .......................... 137/1 |
| 5,844,415 A | | 12/1998 | Gershenfeld et al. |
| 6,051,981 A | | 4/2000 | Gershenfeld et al. |
| 6,066,954 A | * | 5/2000 | Gershenfeld et al. ....... 324/671 |
| 6,333,691 B1 | * | 12/2001 | Janus .......................... 340/552 |
| 6,445,294 B1 | * | 9/2002 | McDonnell et al. ........ 340/562 |
| 6,628,265 B1 | * | 9/2003 | Hwang ........................ 345/156 |
| 6,859,141 B1 | * | 2/2005 | Van Schyndel et al. .... 340/562 |
| 6,922,059 B1 | * | 7/2005 | Zank et al. .................. 324/457 |
| 2002/0093491 A1 | * | 7/2002 | Gillespie et al. ............ 345/173 |

OTHER PUBLICATIONS

"Field Mice: Extracting Hand Geometry From Electric Field Measurements" IBM Systems Journal, vol. 35. Nos. 3&4, 1996 by J.R. Smith of Gershenfeld et. al.

William Beaty Publications on Internet in Regard to Electrostatic or Electric Field Sensors. http://www.amasci.com/electron/e-field2.txt Note: DC Detection Only. 1994.

(Continued)

*Primary Examiner*—Anjan Deb
*Assistant Examiner*—Jeff Natalini
(74) *Attorney, Agent, or Firm*—Thorpe North & Western, LLP

(57) ABSTRACT

A method and apparatus are described for interacting with electronic devices through motional commands. The method uses perturbations of the background quasistatic electric fields. The apparatus measures perturbations in electric potential relative to the background. Body movement is recognized by comparing changes in signals over time. Signals collected from sensors are compared with training sets to recognize specified motional commands or gestures. Upon recognizing the commands, the apparatus issues the predetermined response to the motion.

20 Claims, 3 Drawing Sheets

OTHER PUBLICATIONS

New Week Nov. 17, 2003. "Play Station 2 Gets an Eyeful" Demonstrates/Discusses Capability of MCS but Uses Camera/Video Instead of Electric Field Sensing.

William Beaty Internet Publication, 1987 "Ridiculously Sensitive Charge Detector" DC Only www.amasci.com/emotor/chargedet.html.

* cited by examiner

PATENT APPLICATION FOR A COMPUTER MOTIONAL COMMAND INTERFACE

CROSS REFERENCE TO RELATED APPLICATIONS

This application claims benefit of U.S. Provisional Patent Application Ser. Nos. 60/445,548 filed 2003 Feb. 6, and 60/515844 filed 2003 Oct. 30.

STATEMENT OF FEDERALLY SPONSORED RESEARCH OR DEVELOPMENT

Not applicable

REFERENCE SEQUENCE LISTING OR COMPUTER PROGRAM

Sequence listing is not applicable. A computer program using MATLAB language is provided to demonstrate a motional command recognition algorithm.

BACKGROUND OF THE INVENTION—FIELD OF INVENTION

This invention relates to fields of computer peripherals and motion recognition for the control of electronic apparatus, specifically to aid in the input of commands to computerized devices, and to add artificial intelligence features to a user interface. It is related to proximity and motion sensing of a person and objects.

BACKGROUND OF THE INVENTION

The ability to communicate with a computer through peripherals has been developing for years from the punch card, CRT, DOS keyboard line commands, windows type programs using a mouse, light pens and stylists, to speech recognition. All but speech recognition systems require touch control. A speech recognition interface on the other hand is not very useful in a public setting.

It has been determined by some researchers of human communication that body language comprises as much as 80% of the message communicated between people in a conversation. Thus to improve communication between computers by making the quality of human-computer interface more humanly realistic and personal, a body language interface is needed.

Human interaction with a computer is void of personal realism for at least two reasons. One, a user does not interact with a computer like one interacts with another human being through body language and motional commands. Two, a computer does not recognize and respond according to the state of mind of a user, which is normally indicated through body language or motional commands. Thus, to improve the personal realism in communicating with a computer, a motional command interface is needed with a sensing system to recognize motional commands and body language.

Virtual reality systems detect and decipher motion by using gloves with sensors, or similar approaches with sensors on the body for detecting motion. The drawback with these methods is that they require a physical connection to the user making it awkward for many users to use and making it difficult to switch users.

Contemporary wireless communication technology and GPS may offer possibilities but they only track the location of the device. Thus, to recognize body language such as folding arms, a complex system of receivers and or transmitters would need to be placed on the user's body. Another drawback to these technologies is that the process of active radio transmissions at times can interfere with communication in aircraft, or medical equipment. Active transmissions use power and reduce battery life on portable units. Active transmission is also undesirable when trying to conceal the sensor system from detection. There are times when the RF exposure may cause health risk or concerns to individuals. Also the active transmission of RF is of concern to the regulating authorities such as the FCC to avoid excessive electrical noise. Hence, what is needed is a non-contact motional command sensing system with option to operate passively.

Other motion sensing schemes include real time video image analysis, sonar, radar, laser or infrared. Video analysis tends to lack depth perception, and only senses two dimensional images unless a variable focal length lens is used. With the other sensing methods, it becomes impractical to implement a motional command language interface due to hardware cost, complexity of hookup, and required processing power. Although the other sensing methods may provide three-dimensional imaging, the main difficulty with these methods is that beam forming is required. Hence, what is needed is a simplified method of implementing a motional command interface on personal computing and electronic devices.

At times the motion sensor may require concealment by embedding it in a material while still maintaining passive features. It is true that the video analysis is a passive process, and infrared may be; but neither of said can be covered by common materials such as construction material and still sense the motional command.

Computers widely used today mostly issue a command or response in the form of keyboard strokes, or mouse movements and clicks, with the exception of speech recognition. Computer access speed is compromised for simple and intuitive tasks when using a mouse, keyboard or stylist to click and point. For example, when reviewing video or information on forms and screens, one my need to push the stop, forward, or okay button with a mouse.

Additionally, repetitive movements of using mechanical peripherals often cause injury, such as running of a scroll button, or clicking to close a window. These motions all rely on some mechanical movement of a peripheral device or involve a pointing process with a pen or finger on a touch sensitive screen. Lets refer to these types of motions as the screen method of human-computer interface.

In the screen method the interaction zone between the user and computer is the two-dimensional plane of the screen. This method of interfacing human commands to the computer is slow and tedious, particularly on small video screens as on palm-sized devices. What is needed is a faster touchless method of controlling the computer through motional command language where the commands are detected in a volume of three-dimensional space called the interaction zone as opposed to mouse movements mapped to a physical two-dimensional flat space on a computer screen.

Systems using mechanical peripheral pointing devices and the screen method also require visual interaction to operate. This is, at times, tedious for even simple tasks, and is inconvenient for use with mobile computing devices, or while being mobile such as when driving a car. They are inconvenient when the user is too far from the computer unit to see a mouse cursor. They are not applicable when the user walks into a room and wishes to use hand signals to issue a command to turn on and adjust the lighting. Another example is when the user is lounging in a chair in front of the TV and the remote control is elsewhere. In this case, if a motional command system was installed to have the interaction zone at the location of the person in the chair, the user could issue a motion of the hand to change the TV channel or fast rewind a DVD. Thus, what is needed is a motional command language system self-contained in a computer video display unit, and with options to have a remote-sensing units distributed throughout the home or at other convenient locations.

In summary, to make computer-human interaction more natural, our sensing system requirements are that a peripheral control device needs to be: self-contained or embedded into the computer or in objects from which the computer is to be controlled; touchless; non-contact; offer passive wireless technology capability; operable in a three dimensional interactive zone; able to remove tedium of visual screen inspection; and able to sense and respond to motional commands of the user, and ultimately body language.

No known prior art addresses all the above sensing system requirements for a motional command system.

In this invention, sensors are used to detect electric fields by measuring the electrical potential in space. An electric potential measurement is done with a high input impedance electrode so the circuit attached to it does not alter the potential under measurement. The frequency is so low the fields are almost static or quasistatic, and therefore obey the principles of electrostatics. These type of fields are called E-fields.

The prior art by Neil Gershenfeld and Joshua R. Smith in U.S. Pat. No. 6,051,981 uses electric field sources created by a transmitter with a different sensing method. They also disclosed a gesture wall, and a Phish as a mouse controller. Their sensing method measures currents from a transmitter and into receiving sensors. Their sensors' electrodes are effectively at earth ground electric potential. This fact causes the receiving sensors to distort the electric potential distribution in space simply by their presence. Plus there is not a passive option, since the currents need to be measured from the transmitter. Other prior art referenced in their patent seem to not have the capability or recognize the value of operating passively.

Beaty discloses on the Internet in 2000, a discrete FET circuit and an operational amplifier circuit to detect electric field signals from static electric charge. The amplifier produces a signal with strength indicative of proximity to static charge only. The disclosed is directed toward detecting static charged objects. No motional command system is mentioned. Also nothing is said about detecting uncharged objects.

Other capacitive type proximity sensors using AC frequency shift due to changes in oscillator capacitance have been recognized since around the time of the advent of radio circuits. These methods suffer from low input impedance, and consequently lack range, and alter the background field by the antenna. This occurs because a resonant tank circuit is used. They also require an oscillator attached to an antenna, so it is really an active method.

The inventor is not aware of prior art found passively using the AC 50 Hz–60 Hz part of the electromagnetic spectrum with a high input impedance device. In fact, most low frequency electronic device designers struggle to filter out the energy in this frequency band.

BACKGROUND OF INVENTION—OBJECTS AND ADVANTAGES

The lower the frequency of the electric fields, the more quasistatic the electric fields become such that:

a) objects except conductors appear as high impedance electrical loads and thus do not distort the electric field much, i.e, are essentially transparent;

b) even slightly conductive objects having contact with earth ground have a substantially lower impedance than nonconductors in contact with ground;

c) electrostatic principles apply;

d) the electric fields penetrate deeply through objects.

Gershenfeld et. al. disclose 100 kHz as a lower operating frequency, and demonstrated devices operated at frequencies of around 0.5 MHz. At these frequencies, the objects in vicinity of the body being detected are more conductive than at frequencies below 1 kHz. Thus distortion may occur and contribute to nonlinearities.

Gershenfeld does state his method requires the solution of nonlinear equations, and the solutions are degenerate, i.e., not uniquely defined. His method of using electrodes at ground potential also requires measurement of current from a transmitter, which is to determine the total amount of current that could be detected in the sensors. If objects of low electrical potential are near, they will distort the potential field and affect the measurement accuracy by reducing current arriving at the receiving electrodes.

The present invention uses receivers with high input impedance so as not to draw currents or distort the field. Also, in the passive mode, the frequencies of operation are that of or near the electrical power line frequency and are surely quasistatic. These frequencies are extremely low, and substantially reduce the conductivity of objects near the sensor, thus preventing field distortions.

With further amplification circuitry not shown, we found in the passive case, the sensitivity of the 60 Hz A.C. amplitude was found to depend linearly after taking the logarithm of the response. The sensitivity was detected to a range of about 40 inches. This range is sufficient to have a good motional command zone defined in front of a computer monitor, or other device and appliances.

It is one aspect of this invention to make computers and robots more human-like by increasing the personal realism of interacting with these devices through a motional command system (MCS) that offers a friendly and efficient means of interfacing the user's motional commands and body language with the computer.

It is another aspect of the invention to provide a personal computer interface that responds more efficiently with less tedium than using pointing device peripherals.

It is another aspect of the invention to allow the user of the MCS to interact more naturally, and be more mobile and active while interacting with a computer.

It is another aspect of this invention to make a touchless motional command system (MCS).

It is another aspect of the invention to provide a method for processing MCS data so the computer can recognize and respond to motional commands and body language of the user with or without additional modalities.

Another aspect of the invention is to make a sensing system for the said MCS.

It is another aspect of this invention to provide the computer with a visual display or other device having a video display unit having a self-contained motional command system (MCS) that includes a sensor system, electronic hardware, and software.

It is another aspect of the invention to provide a MCS with a remotely locatable sensing system as a peripheral for receiving motional commands.

It is another aspect of the invention to provide a method for defining commands for recognition, and dispatching of computer responses as a result of the recognition, so the computer is trained to recognize and respond to the motional commands of the user.

Another aspect of the invention is to provide a passive method to detect motional commands issued to the computer.

Another aspect of the invention is to provide a passive method to detect a body's presence and motion.

Yet another aspect of the invention is to provide a method for processing MCS body language commands whereby the computer can recognize moods and emotions or matters of urgency of the user and thus responds with helpful processes and gives a personality to a computer.

BRIEF DESCRIPTION OF DRAWINGS

The invention will be better understood upon reading the following Detailed Description while referencing the provided drawings.

DETAILED DESCRIPTION—PREFERRED EMBODIMENT

Those skilled in the art of electronics will recognize the variation of the technology.

The local background noise characteristic of the A.C. line and computer signals are detected and modulated by the presence of the user's command surface in the vicinity of the motional command system (MCS) sensors. Here the command surface is referred to as the hand or body part issuing the motional command.

Figure 1:
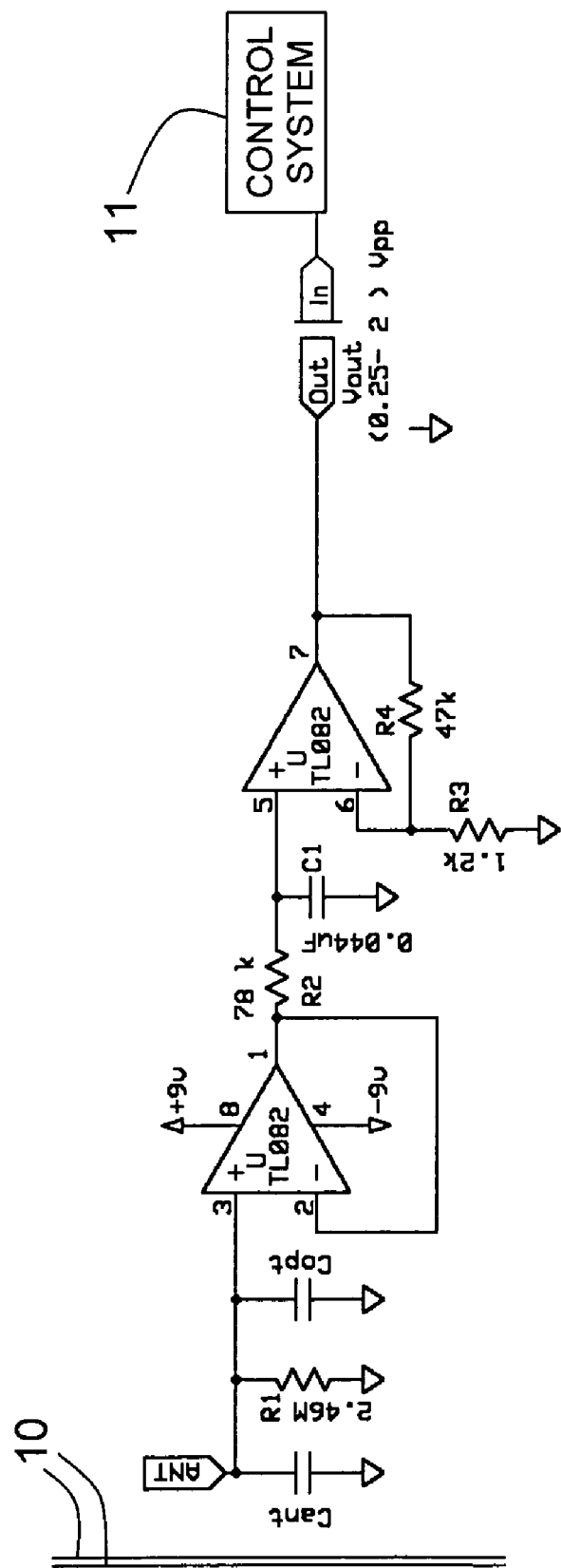
FIG. 1 shows a schematic for the Motional Command Sensor amplifier built on solderless breadboard. A 10% reduction was observed in the characteristic background of 60 Hz, A.C. signal, amplitude when a hand approached the sensor to a distance of ½ inch. Sensitivity was observed at 18 inches away from the antenna. A 2 Vpp output was observed when the user was grounded to a metal lamp with large surface area over the sensor. Otherwise the output was 0.25 Vpp with the user grounded to the common.

FIG. 1 describes the sensor as consisting of a small 4 in. long antenna with an amplifier assembled on a solderless breadboard. The input stage is a buffer amplifier with high input impedance, followed by a low pass filter and then an amplification stage.

Figure 2:
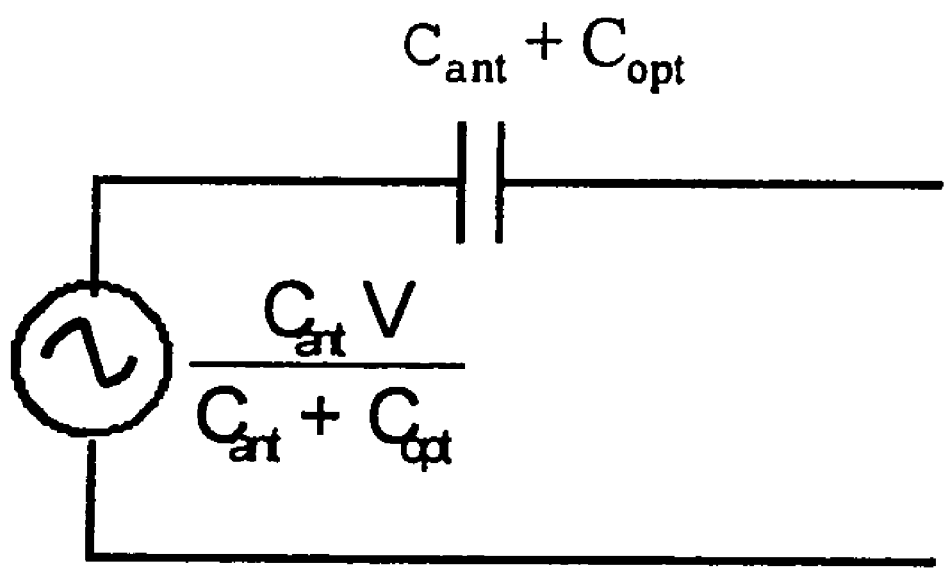
FIG. 2 shows the Thevenin equivalent circuit for the antenna with effect of adding capacitance $C_{opt}$ that occurs when the user's motional-command surface is near the antenna. This model shows the source voltage into the amplifier is reduced as the motional command surface approaches the antenna, hence the sensitivity of the amplifier is decreased. Model predicts from observed measurements that $C_{opt} = \frac{1}{9} C_{ant}$. The high input impedance of the TL082 makes the voltage input sensitive to changes in source impedance. This amounts to sensitivity to small changes in capacitance at low frequencies such as the A.C. line frequency of 60 Hz. The output of the MCS sensor decreases with increasing $C_{opt}$ that occurs as the motion command surface approaches the antenna.

At the low frequency of 50–60 Hz of the A.C. line, the antenna acts as an equivalent electric source in series with a capacitor represented in FIG. 2 as $C_{ant}$. To understand this model, we recall that the conductor is an equipotential surface maintained at a potential determined from the background electric fields. Now consider the case when the user's body is held at a constant electric potential such as the case when the user is grounded or held at an electric potential by a voltage source. By moving the user's hand or command control surface toward the antenna, charge on the antenna rearranges itself. This polarization of charge on the antenna and surrounding objects is necessary to ensure the electric potential is maintained on each object.

The above effect is very well known and is published for the case of an electrostatic source. It is commonly recognized when a static electricity source is moved in the vicinity of a high input impedance amplifier. The problem is a static electricity source is needed. Thus, this phenomenon is not the preferred sensing method in the embodiment of this invention.

Instead, what is invented is a motional command system that uses the electric polarization phenomenon as a means to modulate the sensor's sensitivity to a characteristic background source. The physics of the process used in this disclosure is one involving scattering field theory rather than source field theory like that for the electrostatic source. The motional commands are also discernable from DC offsets produced by electrostatic sources such as lightning or static buildup on the user or surroundings. The method of detection and signal processing method is now described for building a computerized motional command and body language interface.

A new feature in this invention is the deliberate use of the background noise characteristics to detect motional commands and body language. The motional commands modulate the sensitivity of the sensor to the characteristic A.C. background. This A.C. background may be a 50 to 60 hertz background noise signal resulting from the normal A.C. power lines 10, FIG. 1, in the vicinity of the sensor. The induced polarization charge on the antenna is caused by a spatial change in the electrical potential conditions. The electrical potential in the spatial dimension satisfies Laplace's equation. Doing so dictates the presence of the polarization charge on the antenna and the surrounding objects.

FIG. 2 shows a model of the amplitude reduction using a voltage divider. The capacitance $C_{opt}$ occurs between the person's hand or body in proximity to the sensor, and the sensor itself. Since the antenna is small compared to wavelength, the antenna is not resonant, and the source impedance of the antenna is that of a capacitor. The capacitance depends upon the antenna geometry and its position relative to the surrounding objects. In the absence of the presence of the MCS user, i.e. beyond the range of the sensor, the capacitance $C_{ant}$ is a small value probably having a stray capacitance of about 5–30 pF. Thus the antenna is a high impedance source at 50–60 Hz on the order of $10^9$ Ohms. The parallel input resistor of 2.5 Megaohm reduces the antenna input impedance to this value which causes some filtering and allows bias currents to flow. However, the amplifier is still very sensitive to the voltage across its input because the TL082 has an input of $10^{12}$ Ohms.

When the MCS user is held at an electrical potential such as ground, and the user's command surface such as his or her hand is placed within the interaction zone of the MCS, additional polarization occurs to the charge on the antenna. This is equivalent to an additional capacitance forming between the antenna and ground. This capacitance is represented in FIG. 1 as $C_{opt}$. It is noted that the user is typically held at ground potential to see the effect of the $C_{opt}$ best; but it is at times convenient to modulate the user's electrical potential between ground potential and another so as to encode the modulation of the characteristic background. Hence command signals and body language from multiple users of the MCS could be coded and decoded so as to avoid interference. There are several methods or means to doing this. One is to naturally rely on the electrical conductive property of the shoes. Another is to have the person touch a ground electrode or a modulated grounded electrode while giving the motional command.

The effect of the presence of $C_{opt}$ is to reduce the sensitivity of the amplifier. Such reduction results in a noticeable amplitude modulation of the characteristic background noise waveform produced at the output of the MCS sensor in FIG. 1. The output of the MCS sensor will generally be connected to a control system 11, FIG. 1, which can control an electrical appliance such as a computer.

The capacitance $C_{opt}$ is expected to behave as some inverse power to distance of separation between the antenna and the user's command surface. Also, it is expected to be proportional to the area of the antenna in the direction of the vector connecting the antenna center and user's command surface. It is also proportional to the command surface area.

For the circuit shown in FIG. 1, built on a prototyping board, a sensitivity of about 18 inches from the antenna was observable on an analog oscilloscope. The location was at the breakfast table of a newly constructed home. The setup uses a TL082 Texas Instrument JFET OP amp. The amplitude decreases as the user's hand approached the antenna that is a 4 inch piece of number 22 solid copper wire with insulation. This is in agreement with the model and the fact that capacitance appears inversely proportional to distance over this range of distances. The change in voltage is about 10% of 250 mV peak-to-peak signal. If the user is grounded, for example, by making contact with a desk lamp with housing connected to the ground wire in the electrical wiring, the observed output signal from the circuit in FIG. 1 increased to 2.5 V peak to peak. Again the change in amplitude as the hand approached the sensor antenna is about 10%. Also, the signal is optionally frequency modulated by placing a resistor about 10 kOhm and a switch between the user and the common of the amplifier. Such a method may be used to make unique identification of issues of motional commands.

The sensitivity of the circuit to user motion is in part due to the high voltage sensitivity occurring from high input impedance of the buffer amplifier, and in part due to the filtering. The high frequency noise is removed by the low pass filter appearing before the gain stage shown in FIG. 1. The input circuitry to the buffer stage acts as a high pass filter. In fact, the output of signal level of the buffer stage is about 5 mV peak to peak for the particular level of 60 Hz AC background. Additionally, the final gain stage in this embodiment has a gain of about 50.

The resistor parallel to the amplifier input is used to cause some high pass filtering and to prevent the amplification stage from saturating by adjusting input level to the gain stage and by providing a return path for the amplification stage.

A variable resistor voltage-divider is also alternatively used to adjust the sensitivity by limiting the input into the low pass filter prior to the final amplification stage. The overall sensitivity to both the characteristic background and the modulation due to motional commands is also achieved by placing a capacitance in parallel with the shunt resistor R1 in FIG. 1.

Since the modulation is only 10% of the characteristic signal amplitude, a differential amplifier is easily placed between two MCS sensors similar to that of FIG. 1. Preferably the two antennas would drive two buffer stages like that in FIG. 1; but immediately afterwards, a differential amplifier such as the Burr Brown LM105 would be used. The output of the amplifier would then go to the low pass filter and the final amplifier stage like that in FIG. 1.

The particular values of components used, and the measured voltages depend upon the features of the characteristic signal used as input to detect the modulation due to capacitance changes between the antenna and the user. It is clear to anyone working in the art that the exact output level and sensitivity of the motion command system sensor shown in FIG. 1, depends upon the user's environment. Such variables are the ambient characteristic noise level input to the buffer amplifier and the frequency thereof, the antenna and input impedance characteristics of the amplifier, and the electrical potential, electrical conductive properties, and the size of the user control surface. Those skilled in the art of electronics are able to modify and or make adjustable circuit parameters and physical properties of the system to have a MCS sensor to be tunable to operate in the user's environment. But none-the-less the principle of operation is the sensitivity of the amplifier to the characteristic background noise as modified by the presence of the user's command surface within the interaction zone of the sensor.

Figure 3A:
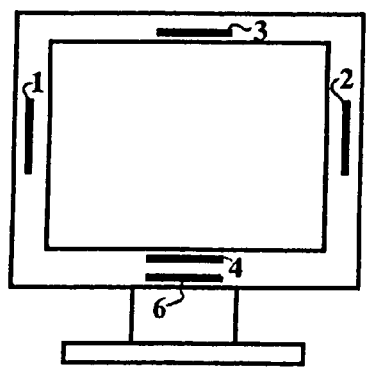
FIG. 3 shows the preferred embodiment of Motion Command System on a video monitor. Six sensors are used to sense motion in three dimensions. Sensors 1 and 2 sense horizontal motion, sensors 3 and 4 sense vertical motion, and sensors 5 and 6 sense motion in the depth direction normal to the screen. An optional sensor 7 is possible for measuring background noise as a reference. The six MCS sensors are used in either single ended mode, or combined in a differential amplifier to measure difference with respect to reference sensor 7. Alternatively, sensors 1 through 6 have a reference electrode along with the main antenna, so that two buffer stages like those in FIG. 1 are combined with a differential amplifier, and then driven with the filter and amplifier.
Figure 3B:
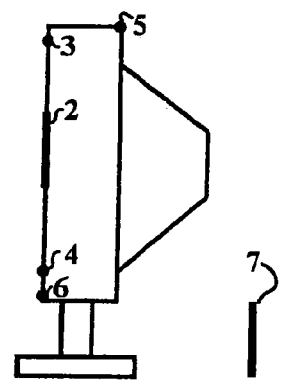
Figure 3C:
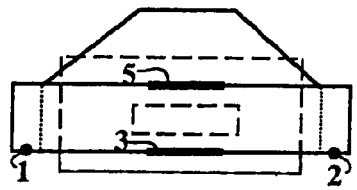

The motional command system is sensitive to motional commands having duration of 0.2–3 seconds. The preferred embodiment of the MCS is in a computer or video display unit. FIG. 3 indicates the placing of sensors on the sides of a CRT computer monitor forming an array of MCS sensors. The sensors may be placed inside the monitor housing. Sensors 1 and 2 are placed to the left and right, sensors 3 and 4 to the top and bottom, and sensors 6 and 5 to the front and back of the CRT monitor display area. The antennas of the sensors 2 and 1 are oriented vertically on the right and left sides, the antennas of the sensors 3 and 4 are oriented horizontally on the top and bottom, and the antennas of the sensors 6 and 5 are oriented parallel to the screen on the front and back. To make the positions of the sensor clear, FIG. 3 shows the layout. An optional sensor 7 is possible for measuring background noise as a reference.

The sensors work in pairs. The sensors on the right and left side are used to sense motion along the horizontal axis while the sensors on the top and bottom are used to sense motion along the vertical axis. The sensor pair on the front and back are used to sense motion along the axial axis perpendicular to the face of the screen.

Each sensor in the array sends a voltage signals to a data collection system that can process the signals. Such a system can be a stand-alone computer processor such as a DSP and analog to digital (A/D) converter, and support electronic hardware, or it can be the computer device the user is interfacing to with the MCS supplemented by some support electronic hardware. We refer here to the support electronic hardware including the A/D, control circuitry, and supplemental signal conditioning as the MCS support-ware.

In the preferred embodiment, the sensor signals are run into a differential amplifier so as to subtract out the background noise level. This may be done in hardware or software. The signals are digitally recorded by the computer soundcard. The sound card is sampled at an appropriate rate to preserve quality. Prior to entering the soundcard, some hardware is used to multiplex the analog signals from the six MCS sensors and amplify the signals if necessary. Thus the data from each sensor is sampled at 8 kHz if 48 kHz sampling rate is used on the sound card. Other sampling rates are of course possible. Additional amplification is also used to make the maximum input to the line of about 2.0 V peak to peak. An automatic gain control circuit is easily implemented. This amplifier comes after the MUX in the signal stream. Additionally, there are voltage comparators placed on the output of each sensor. Other triggering schemes are easily envisioned, such as by nearly real time software I/O.

The interaction zone is defined as the volume of space where the motional commands are processed. The focal point is defined as the origin in space where the motional commands will be issued. In the preferred embodiment, this is in front of the computer monitor a distance of about the separation between the horizontal pair of MCS sensors. At this point the user places his or her command control surface such as his or her hand. The MCS is activated and calibration data is collected by the data acquisition system. The data is used to scale the signals so the difference between signals from the pair of sensors is zero at the focal point.

Next the user defines motional commands. By activating the command recorder software program, the sensor data is collected while the user issues the desired command to be recorded. This process is done several times to establish statistics and a database of commands. The signals from the sensor are used as training data for the MCS processing software. Commands to be issued by the computer are also assigned during the training period. Triggering threshold levels and logic are also determined during this process.

Next an MCS command is issued. The sensors begin collecting data for a set duration of 0.2–3 seconds when the analog trigger level is exceeded. This happens upon motion of the user control surface about the interaction zone focal point. Based upon the signal processing of the training data, the trigger levels are determined and set automatically in the MCS support-ware by MCS software. Next the computer processor runs a digital processing algorithm and decides whether a command that was programmed is recognized. If so, the system responds with appropriately programmed action.

The digital processing command recognition algorithm extracts the envelope of the signals from the MCS sensors, applies a calibration base on the focal point calibration, then normalizes the data to maximum value of unity. From this process, cross correlations are computed between each channel of the training data and the channel data of the recorded acquisition. From the results, correlation coefficients are obtained between the recorded command channel data and the training data. Commands are recognized by correlation values exceeding threshold values set on the correlation coefficients. The thresholds are set on six correlation coefficients for each channel, the autocorrelation, and five cross correlation coefficients.

The preferred embodiment is the most advanced application, and the number of sensors can change and be as few as one. For A.C. operation as described, the person or body is preferably grounded or connected to a switched grounded connection. D.C. signals are recognized well when the person or body is not grounded. They appear as an increase in potential followed by a negative tail when the A.C. signal is filtered to remove the A.C. component of the line frequency. There are also intermediate states of conductivity between the body and the ground that result in a mixture of both A.C. and D.C. components in the signal. The extent depends upon the filtering chosen and the gain of the subsequent stages of amplification, not shown in FIG. 1. Also, transient fields from charge polarization where potentials from muscle flexing can generate charge polarization are possibly detected as the hand extends quickly to and from the sensor.

Also the invention covers variations in implementation including hardware and software. The sensors can be implemented to detect DC offset caused by ungrounded bodies. The DC is seen more readily when the signal is low passed filtered and amplified. An ungrounded individual moving his or her hand past the sensor is detected by recognizing the DC offset. This may only be a transient response, but being useful it is also covered in this invention for certain application of controlling devices such as toys. Otherwise the DC component shows up as a DC offset occurrence on the AC signal. Depending upon the degree of further amplification, it may be difficult to remove when caused by transient sources such as passing the hand past the sensor. Thus, at times the DC component is indicative of proximity and useful in devices.

The invention may be used to detect a body's presence or motion, such as an individual by either the D.C. shift, or A.C. amplitude reduction, and in some cases both phenomena.

The application of the invention applies to the sensing method, and is useful to make toys produce music, lights, and motion of some object in response to the signal detected by the said sensors. In particular, a baby mobile, or a toy similar to the popular "Musini" by NeuroSmith, a toy that plays music as the children jump can be triggered in this way. Both these devices, and others, can benefit from the E-field sensor technology described in this invention. Doors could be opened and closed easily by hand motion. Also, a person can be detected by sensing through a door to notify as a door bell, or warn if someone is coming through the door.

The invention claimed is:

1. A device for sensing presence and motion of a body in an interaction zone, comprising:
    a sensor positioned to pick up electrical fields existing in the interaction zone and providing an output voltage signal representative of the electrical fields sensed;
    a first stage buffer amplifier having an input and an output;
    a high pass filter connecting the output voltage signal from the sensor to the input of the first stage buffer amplifier;
    a second stage amplifier having an input and an output;
    a low pass filter connecting the output of the first stage buffer amplifier to the input of the second stage amplifier;
    wherein the output of the second stage amplifier is a signal representative of the electrical fields sensed by the sensor within a desired range of frequencies.

2. A device for sensing presence and motion of a body in an interaction zone, according to claim 1, wherein the sensor is configured to have electrical characteristics of an electric source in series with a capacitor.

3. A device for sensing presence and motion of a body in an interaction zone, according to claim 1, wherein the body in the interaction zone creates a capacitance electrically in parallel with the sensor, the amount of capacitance created by a particular body depending upon the position of the body in the interaction zone, the closer the body in the interaction zone to the sensor, the greater the capacitance created.

4. A device for sensing presence and motion of a body in an interaction zone, according to claim 3, wherein the capacitance in the interaction zone decreases the output voltage signal of the sensor, the amount of decrease in the output voltage signal depending up the amount of capacitance created which is dependent upon the position of the body in the interaction zone.

5. A device for sensing presence and motion of a body in an interaction zone, according to claim 4, wherein the sensor senses a background electric field in the interaction zone.

6. A device for sensing presence and motion of a body in an interaction zone, according to claim 5, wherein the background electric field has a voltage and a frequency, and wherein the first stage amplifier has an input impedance high enough to preserve the output voltage signal from the sensor and to keep the sensor floating at the voltage of the background electric field, but small enough to keep the corner frequency of the high pass filter near the frequency of the background electric field.

7. A device for sensing presence and motion of a body in an interaction zone, according to claim 6, wherein the capacitance created by the body in the interaction zone is electrically a part of the high pass filter, wherein the high pass filter has a corner point at a particular frequency, wherein an increase in the capacitance shifts the corner point lower, and wherein sensitivity of the device at the frequency of the background electric field increases as the corner point decreases.

8. A device for sensing presence and motion of a body in an interaction zone, according to claim 7, wherein the background electric field is an A.C. background noise field of between about fifty and about sixty hertz created by power lines in the vicinity of the sensor.

9. A device for sensing presence and motion of a body in an interaction zone, according to claim 8, wherein the corner frequency of the low pass filter is below fifty hertz.

10. A device for sensing presence and motion of a body in an interaction zone, according to claim 2, wherein the body in the interaction zone acts as an electric source to increase the output voltage signal of the sensor.

11. A device for sensing presence and motion of a body in an interaction zone, according to claim 1, wherein the device is a part of a control system for an electrical apparatus and the output of the second stage amplifier is connected to the control system whereby a body motion in the interaction zone at least partially controls the electrical apparatus.

12. A device for sensing presence and motion of a body in an interaction zone, according to claim 11, wherein the control system includes at least one pair of related sensors wherein the system determines motion of the body along an axis between the pair of related sensors.

13. A device for sensing presence and motion of a body in an interaction zone, according to claim 12, wherein two pairs of related sensors are used to determine motion of the body in two dimensions in the interaction zone.

14. A device for sensing presence and motion of a body in an interaction zone, according to claim 13, wherein three pairs of related sensors are used to determine motion of the body in three dimensions in the interaction zone.

15. A device for sensing presence and motion of a body in an interaction zone, according to claim 11, wherein the electrical apparatus to be controlled is a computer including a display device, and wherein the device sensor is part of the computer display device.

16. A method for sensing presence and motion of a body in an interaction zone, comprising the steps of:
positioning a sensor to pick up electrical fields existing in the interaction zone and to provide an output voltage signal representative of the electrical fields sensed, the electrical fields sensed including a background electrical field of a particular frequency;
eliminating output voltage signal components below a predetermined frequency;
thereafter eliminating output voltage signal components above a predetermined frequency;
amplifying the resultant signal to provide a processed output signal representative of the electrical fields sensed by the sensor within a desired range of frequencies at a particular time; and
comparing the processed output signal representative of the electrical fields sensed by the sensor within a desired range of frequencies at a particular time with a processed output signal obtained for the background electrical field when no body is present in the interaction zone, differences in such signals indicating presence and motion of a body in the interaction zone.

17. A method for sensing presence and motion of a body in an interaction zone according to claim 16, wherein the background electrical field of a particular frequency is an A.C. background noise field of between about fifty hertz and about sixty hertz created by power lines in the vicinity of the sensor.

18. A method of controlling electrical apparatus by a body gesture within an interaction zone, comprising the steps of:
positioning a sensor to pick up electrical fields existing in the interaction zone and to provide an output voltage signal representative of the electrical fields sensed, the electrical fields sensed including a background electrical field of a particular frequency;
eliminating output voltage signal components below a predetermined frequency;
thereafter eliminating output voltage signal components above a predetermined frequency;
amplifying the resultant signal to provide a processed output signal representative of the electrical fields sensed by the sensor within a desired range of frequencies at a particular time;
performing a particular body gesture in the interaction zone and obtaining a plurality of consecutive processed output signals over a particular period of time representing the particular body gesture to create a predefined body gesture signal representative of the particular body gesture;
monitoring further processed output signals over monitoring periods of time;
comparing the monitored processed output signals with the predefined body gesture signal to determine if the predefined body signal is performed and providing an occurrence signal if the gesture is performed; and
using the gesture signal to control the electrical apparatus.

19. A method of controlling electrical apparatus by a body gesture within an interaction zone, according to claim 18, wherein the electrical apparatus to be controlled is an apparatus having a display device, and wherein the sensor is part of the display device to create an interaction zone adjacent the display device.

20. A method of controlling electrical apparatus by a body gesture within an interaction zone, according to claim 19, wherein the step of positioning a sensor to pick up electrical fields existing in the interaction zone and to provide an output voltage signal representative of the electrical fields sensed includes the step of positing at least a pair of related sensors to pick up electrical fields existing in the interaction zone and to provide an output voltage signal representative of the electrical fields sensed by the at least one related pair of sensors representative of the motion of the body along an axis between the pair of related sensors.

* * * * *